United States Patent [19]
Gray, Jr. et al.

[11] Patent Number: 5,549,087
[45] Date of Patent: Aug. 27, 1996

[54] COMBINED CYCLE ENGINE

[75] Inventors: Charles L. Gray, Jr., Pinckney; Karl H. Hellman, Ann Arbor, both of Mich.

[73] Assignee: The United States of America as represented by the Administrator of the U.S. Environmental Protection Agency, Washington, D.C.

[21] Appl. No.: 540,770

[22] Filed: Oct. 11, 1995

Related U.S. Application Data

[63] Continuation-in-part of Ser. No. 432,423, Apr. 27, 1995.

[51] Int. Cl.⁶ .................................................... F02F 1/00
[52] U.S. Cl. ............................................................. 123/254
[58] Field of Search ................................. 123/254, 292, 123/263

[56] References Cited

U.S. PATENT DOCUMENTS

| | | | |
|---|---|---|---|
| 3,867,914 | 2/1975 | Irimajiri | 123/254 |
| 4,513,708 | 4/1985 | Latsch et al. | 123/263 |
| 5,178,109 | 1/1993 | Kawamura | 123/292 |
| 5,277,159 | 1/1994 | Webster | 123/254 |
| 5,333,582 | 8/1994 | Kawamura | 123/254 |

*Primary Examiner*—Raymond A. Nelli
*Attorney, Agent, or Firm*—Lorusso & Loud

[57] ABSTRACT

A method of operation of an internal combustion engine to minimize NOx emission in exhaust gas involves detection of load on the vehicle engine as either a low load or a high load. While a low load is detected unthrottled air and a quantity of fuel providing for lean combustion are mixed with injection of fuel adjacent top dead center in the compression stroke. While a high load condition is detected, throttled air and a quantity of fuel governed by sensed oxygen content of the exhaust gas are mixed in an approximate stoichiometric ratio with injection of the fuel much earlier than injection at low load, preferably during the intake stroke.

16 Claims, 5 Drawing Sheets

FIG. 2
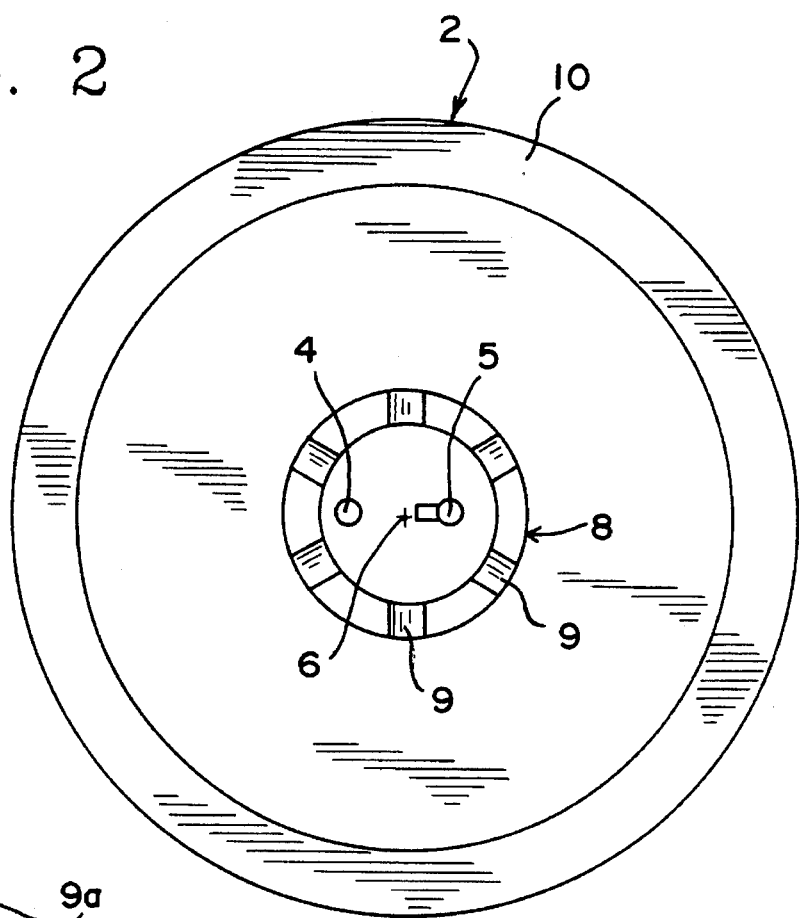
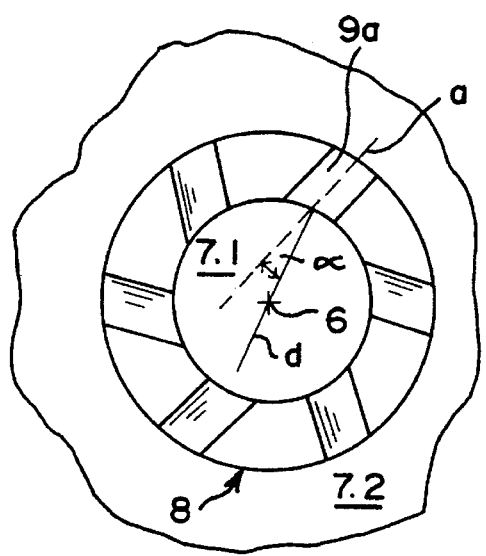
FIG. 2a

COMBINED CYCLE ENGINE

CROSS-REFERENCE TO RELATED APPLICATION

The present application is a continuation-in-part of our copending application U.S. Ser. No. 08/432,423, filed Apr. 27, 1995 and entitled "SPARK-IGNITED RECIPROCATING PISTON ENGINE HAVING A SUBDIVIDED COMBUSTION CHAMBER."

BACKGROUND OF THE INVENTION

1. Field of the Invention

The invention is a new method of internal combustion engine operation that significantly reduces $NO_x$ and other emissions while maintaining high energy efficiency. The field of application is all internal combustion engines.

2. The Prior Art

The growing utilization of automobiles greatly adds to atmospheric pollution. Reducing emissions, especially $NO_x$ emissions, while maintaining or increasing energy efficiency has been especially difficult.

The two most commonly used piston engines are based on the Otto cycle and the Diesel cycle, respectively. The Otto cycle engine is typical of most engines used in passenger cars and light trucks, while the Diesel cycle engine is typical of engines used in heavier trucks and locomotives and other large engine applications.

The Otto cycle engine has certain characteristics that provide for very low exhaust emissions. The Otto cycle engine is a homogeneous fuel/air inducted engine that is spark ignited and has a piston expander. This engine is operated in an air throttled mode to vary the power produced by the engine while keeping the fuel/air mixture within the flammability limits for the particular fuel. At light and medium loads the homogeneous combustion gives smooth performance and low emission characteristics, but the air throttling reduces efficiency. At higher loads the engine, with exhaust gas recirculation and control to a stoichiometric air/fuel ratio, provides for good engine-out emissions and the opportunity for the exhaust to be routed through a three-way catalyst that further oxidizes the unburned fuel and reduces the oxides of nitrogen that have been formed.

The Diesel engine is characterized by a higher compression ratio, direct fuel injection and the absence of air throttling. The combustion is heterogeneous, and at light and medium loads unburned fuel emissions can be a problem. However, because of its unthrottled nature, in conjunction with the high compression ratio of the engine, the engine operates at a higher efficiency at low and medium loads. However, at higher loads the combustion is at high temperature and a significant amount of oxides of nitrogen is formed. Without the ability to operate the engine in a stoichiometric air/fuel configuration, the ability to utilize a conventional exhaust NOx reduction catalyst is eliminated.

SUMMARY OF THE INVENTION

Accordingly, it is an object of the present invention to minimize NOx emission in operation of an internal combustion engine.

It is another object of the present invention to achieve the foregoing objective while simultaneously maintaining or increasing energy efficiency.

In furtherance of the foregoing objectives, the present invention provides a combined cycle which allows the best characteristics of both Otto cycle and Diesel cycle engines to be realized simultaneously. This combined cycle engine would operate at low and medium loads much like the conventional Diesel cycle direct injection engine, where low NOx emission formation and high efficiency are characteristic, while at higher loads the engine converts to closed loop stoichiometric operation, where a conventional NOx reduction catalyst, possibly with EGR, ensures low NOx emissions.

In operation of an internal combustion engine in accordance with the present invention, the load on the vehicle is continuously monitored and taken as either a low load or a high load. Responsive to detection of a low load, a first, unthrottled quantity of air is introduced into the combustion chamber of a piston cylinder during an intake stroke and injection of a first quantity of fuel is initiated near top dead center in a compression stroke, to form a lean combustion mixture wherein the first quantity of air is substantially in excess of stoichiometry. The lean combustion mixture is ignited in a conventional manner. Responsive to detection of a high load, a second quantity of air is introduced into the combustion chamber during an intake stroke and injection of a second quantity of fuel is initiated significantly earlier, relative to top dead center, than is initiation of injection of the first quantity of fuel. At high load, the second quantities of air and fuel are controlled to provide a substantially stoichiometric combustion mixture which is likewise ignited in a conventional manner.

Thus, as the load of the engine increases, the fuel injection timing is shifted from the typical late injection of light load heterogeneous combustion to early injection necessary for homogeneous combustion. This early fuel injection is by direct injection and may occur as early as during the air intake stroke of the engine. Therefore, during the intake stroke and compression stroke, good mixing occurs and at the time of ignition, homogeneous combustion occurs. In this second mode of operation (i.e., stoichiometric, homogeneous combustion), in another embodiment, fuel could also be added via intake manifold injection or carburetion to supplement or replace the direct fuel injection.

Closed-loop, stoichiometric operation at high load is achieved with high exhaust gas recirculation, and/or with air throttling. To achieve closed-loop stoichiometric operation, it is necessary to "trim" the air, fuel or exhaust gas recirculation by a closed-loop, feed-back system. The preferred approach is an open-loop setpoint for the air throttle, supplemented by closed-loop fuel trimming through conventional throttle body or port fuel injection. In any case, operation substantially at stoichiometry during higher power, higher load conditions, in this manner, ensures homogeneous combustion which, in turn, provides high power output, high efficiency and low NOx emissions.

The transition from the direct injection heterogeneous combustion, which is most advantageous for light load operations, to the homogeneous stoichiometric closed-loop operation necessary for higher loads, would be determined based upon optimization testing to assure high fuel economy while meeting the low NOx emission requirements and will vary somewhat with engine size and combustion chamber geometry. Load can be detected in any conventional manner including sensing of throttle opening or air mass flow for stoichiometric high load operation. While the optimum transition point will vary with engine size, combustion chamber geometry and the target level of $NO_x$ emission, it will typically be set at approximately one-third maximum load, e.g. at a point within the range of 30–35% maximum load.

A conventional $O_2$ sensor, mounted and located in a conventional manner, may be used to control the amounts of fuel injected in high load operation. The amount of fuel injected in low load operation is controlled responsive to throttle position.

The method of the present invention can be advantageously practiced using the novel engine design of our copending U.S. application Ser. No. 08/432,423, the teachings of which are incorporated herein by reference. In using that novel engine design, the combined cycle operation at low and medium loads is obtained by directly injecting fuel into the primary combustion chamber, physically containing, for example, 30–50% of the air charge (the remainder of the air charge is in the squish chamber or in an outside ring chamber in the piston or head). This inner combustion chamber provides good combustion and low hydrocarbon emissions during light load operation, typically a problem with direct injection engines, by separating the air charge into two zones mechanically. While lower light load hydrocarbon emissions are expected using this novel engine design, combined cycle operation can also be achieved through the use of other combustion chambers, including a conventional single bowl or "open" combustion chamber.

The present invention is believed to be applicable to (1) a wide range of combustion chamber geometries including a single piston bowl chamber and flat piston chamber, (2) various fuel ignition techniques including glow plug ignition and autoignition fuel or fuel additive, (3) direct fuel injection for low load operation with various options for stoichiometric medium and high load operation including earlier injection using only the direct injection system, using only fuel inducted with the incoming air charge, and various combinations of directly injected and air inducted fuel and (4) any fuel which can operate with homogeneous combustion characteristics, including fuels such as diesel fuel, gasoline, the various alcohols, and gaseous fuels.

BRIEF DESCRIPTION OF THE DRAWINGS

FIG. 2 is a top plan view of the piston shown in FIG. 1.

FIG. 2a is a top plan view of one part of the piston of FIG. 1 illustrating a variant.

DESCRIPTION OF THE PREFERRED EMBODIMENTS

Figure 1:
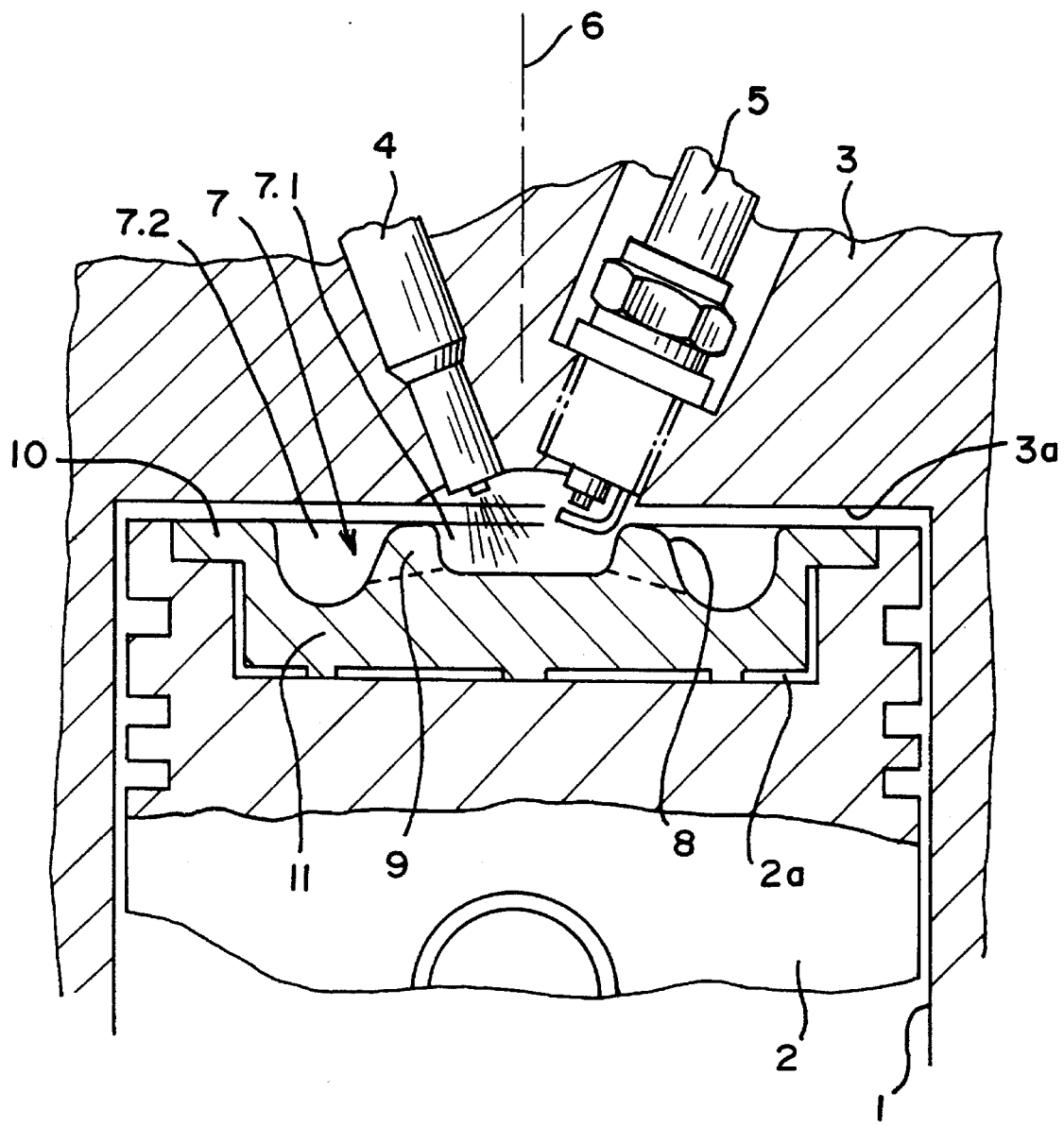
FIG. 1 is a fragmentary axial sectional view of a piston/cylinder assembly illustrating a first preferred embodiment of an engine suitable for use in the present invention and showing the piston in its upper dead center position.

Turning now to FIG. 1, there is illustrated therein an engine cylinder 1 and a piston 2 disposed in the cylinder 1 and shown in its upper dead center position. The upper part of the cylinder 1 is formed in a cylinder head 3 which supports a fuel injection device 4 and a spark plug 5 which, in the illustrated embodiment, are situated close to and on opposite sides of, the cylinder axis 6 and are inclined relative thereto. The inner surface 3a of the cylinder head 3 which constitutes the upper end of the cylinder 1 is substantially planar and has only a slight concave portion in the inlet zone of the injection device 4 and the spark plug 5. The intake and exhaust valves are not shown for the sake of simplicity.

A combustion chamber 7 is defined by the upper face of the piston 1 and the inner surface 3a of the cylinder head 3 which closes off the cylinder 1. On the upper side of the piston an annular ridge 8 is arranged which subdivides the combustion chamber 7 into an inner partial combustion chamber 7.1 and an outer partial combustion chamber 7.2. The inner partial combustion chamber 7.1 is in the effective range of the injection device 4 and the spark plug 5. The annular ridge 8 is provided with a plurality of throughgoing apertures which are constituted by upwardly open radial grooves 9 provided in the ridge 8 and through which the two partial combustion chambers 7.1 and 7.2 are in communication with one another even if the piston 2, as shown in FIG. 2, is situated in its upper dead center position. The outer partial combustion chamber 7.2 is surrounded by an outer ridge 10 arranged close to and along the outer upper periphery of the piston 2.

In the embodiment illustrated in FIG. 1 the partial combustion chambers 7.1 and 7.2 are, together with the annular ridge 8 as well as the outer ridge 10, formed in an insert 11 made of a material whose heat conductivity is less than that of the piston material so that during the intake and exhaust strokes the combustion chamber zone, which comes into direct contact with the fuel during injection, maintains a high temperature. The insert 11 is accommodated in a well 2a provided in the crown (top face) of the piston 2.

It is, however, feasible to provide the partial combustion chambers 7.1 and 7.2 directly in the piston body. In such a case, it is advisable to provide the upper surface of the piston, at least in the region of the partial combustion chambers, with a ceramic coating which may be applied, for example, by a plasma spraying process.

As shown in FIG. 2, the annular ridge 8 is oriented concentrically to the cylinder and piston axis 6 so that the partial combustion chamber 7.1 is circular and the partial combustion chamber 7.2 is annular. In an alternative geometric arrangement of the injection device 4 and the spark plug 5 with respect to the cylinder axis 6, the inner partial combustion chamber 7.1 is shifted towards the spark plug 5. The annular ridge 8, in case of such a shift relative to the cylinder axis 6, may have a shape which differs from a purely circular configuration and which may be coordinated with the flow behavior in the combustion chamber, particularly with the course of the flame boundary upon transition from the inner partial combustion chamber to the outer partial combustion chamber.

The throughgoing ridge apertures 9, by means of which the inner partial combustion chamber 7.1 continuously communicates with the outer partial combustion chamber 7.2, are, in the embodiment illustrated in FIG. 2, centrally symmetrically arranged relative to the injection device 4 and the spark plug 5 (FIG. 1) and have a star-like, radial orientation in order to ensure a uniform passage of the flame front from the inner partial combustion chamber 7.1 into outer partial combustion chamber 7.2 and to thus effect a uniform progression of combustion in the outer partial combustion chamber 7.2 as well. In the variant shown in FIG. 2a, the throughgoing apertures 9a provided in the annular ridge 8 are not radial; rather, the passage axis a of each aperture 9a is oriented at an angle α relative to a diametral line d traversing the ridge 8 and extending to the axis a of the respective aperture 9a.

Figure 3:
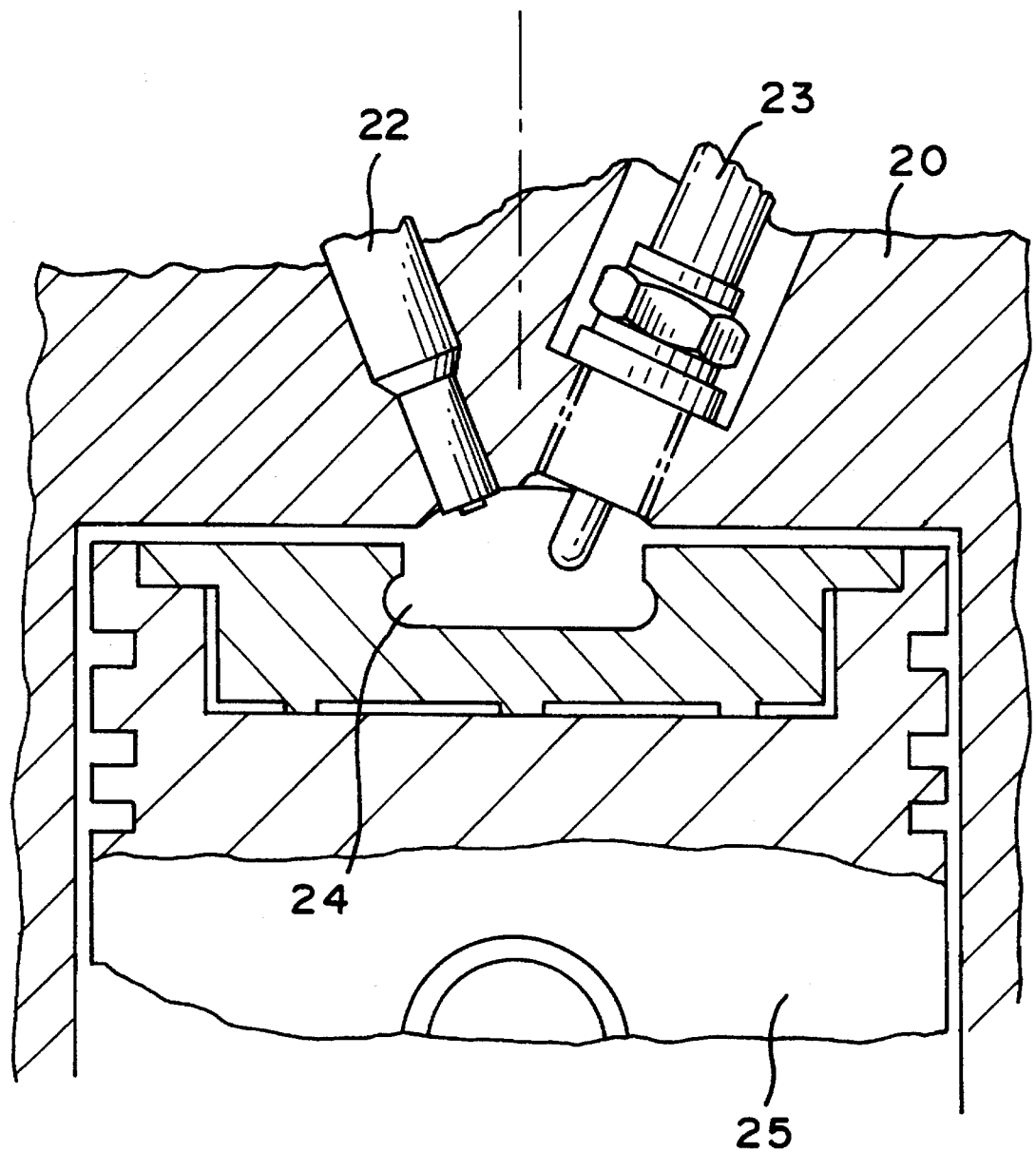
FIG. 3 is a fragmentary axial sectional view of a piston/cylinder assembly illustrating a second preferred embodiment of an engine suitable for use in the present invention and showing the piston in its upper dead center position.

FIG. 3 illustrates another preferred embodiment of a reciprocating piston engine suitable for use in the present invention. Installed in the engine head 20 are a direct fuel-injection nozzle 22 and an ignition source, in this case glow plug 23. Fuel is injected directly into a single combustion chamber 24 (located within the piston 25) at light load as previously described and ignited by glow plug 23. The gases in the chamber 24 can be entirely air or a mixture of air and recirculated exhaust gas which was introduced without intentional flow restriction, i.e., without a throttle.

Figure 4:
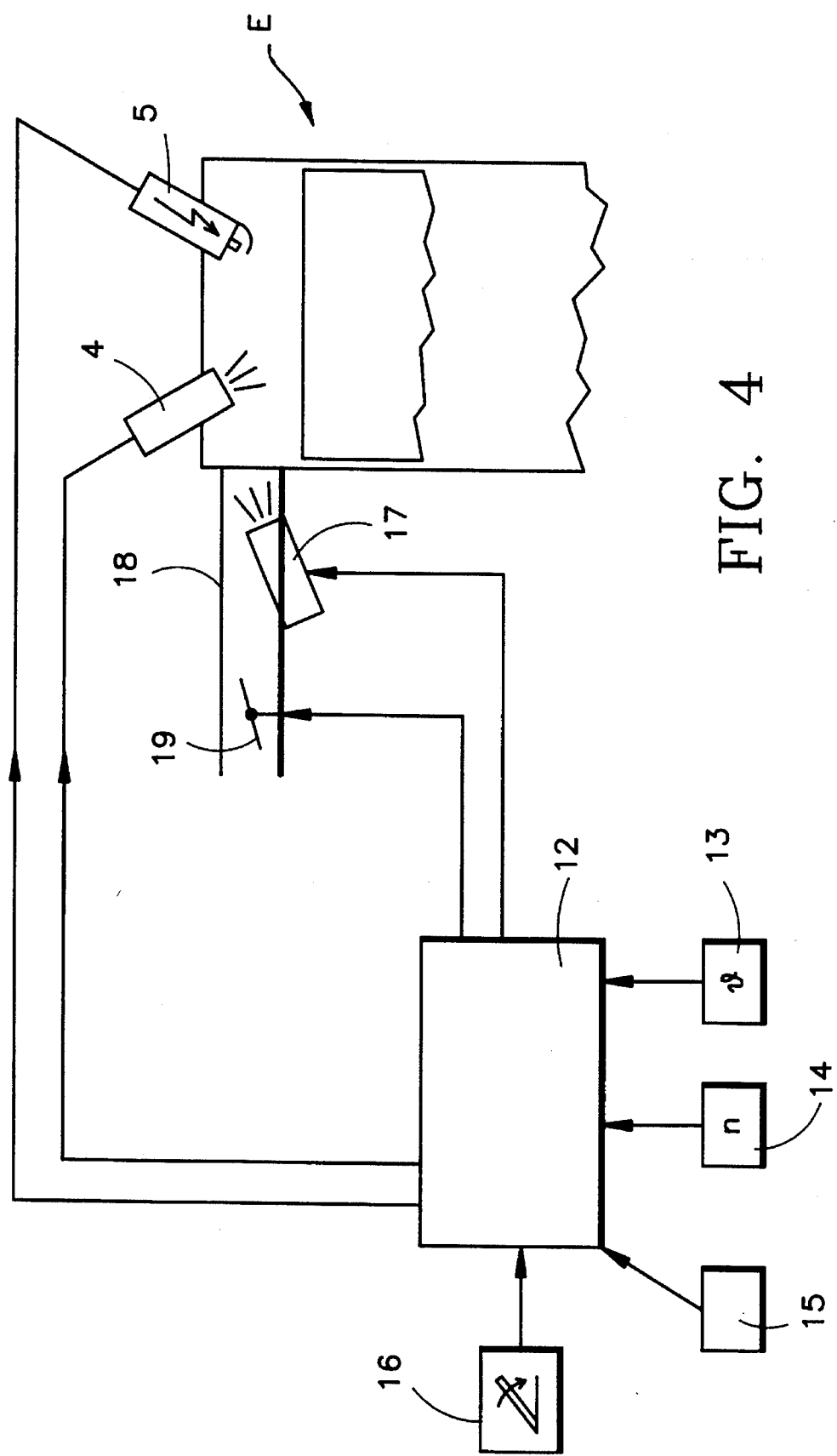
FIG. 4 is a block diagram of a fuel injection system for controlling the engine operation according to the invention.

FIG. 4 shows a block diagram of an engine control (fuel injection control system) for a cylinder in a reciprocating piston engine, having a combustion chamber configuration, for example, as described above. The control arrangement essentially consists of an engine controller 12 in which, as operational data, the engine temperature, the engine rpm and oxygen content of the exhaust gas are inputted through the inputs 13, 14 and 15, respectively. By means of a sensor 16 coupled to the gas pedal, the desired load is transmitted to the controller 12 by the driver. The transition between high load operation and low load operation is set at a value within the range of 30–35% of maximum engine load, as represented by throttle position, e.g. accelerator pedal position detected by sensor 16. Typically, the transition to high load operation will be at a λ of 1.3–1.8, wherein λ is defined as the mass ratio of oxygen in the charge air to the amount of oxygen providing stiochiometric combustion. When that value is reached, the engine controller 12 instructs a transition as quickly as possible consistent with good drivability (a smooth ride).

In the example illustrated in FIG. 4, the engine E is provided with an injection device 4 for directly injecting fuel into the combustion chamber as well as a spark plug 5, as described in connection with FIG. 1. Accordingly, a setting signal from the engine controller 12 is applied to the injection valve of the injection device 4. In this manner it is possible to control the duration of injection and thus the injection quantities as a function of the load signal transmitted by the sensor 16 to the engine controller 12. The timing of injection is also controlled responsive to the signal from sensor 16 as will be later described in more detail.

In addition to the injection device 4, the engine E has a further injection device 17 which opens into the air intake pipe 18 of the piston/cylinder unit of the engine E and which may be controlled by the engine controller 12 as well. In the air intake pipe 18 is a butterfly valve 19 controllable by the engine control device 12 within a predetermined range.

With the aid of the above-described engine control, an engine structured as described in connection with FIG. 1 or FIG. 3 is capable of operating over the entire load range with minimum pollutant emission even if fueled with alcohol. Of course, the present invention is also applicable to other, more conventional internal combustion engine fuels.

High load fuel injection is initiated through fuel injector 4, preferably at least 40° before top dead center (TDC) in the compression stroke, more preferably at least 90° TDC, most preferably in the intake stroke. This early, high load fuel injection allows for more complete fuel evaporation and charge cooling and forms a homogeneous or near homogeneous fuel/air mixture. While FIG. 1 shows the fuel injector 4 located in the cylinder head, in the alternative, fuel may be injected into the intake manifold for even greater mixing and more homogeneous combustion. Low load fuel injection is initiated 20° or less before TDC.

At low load the air is introduced substantially unthrottled and an amount of fuel ("first quantity") is introduced to give a lean combustion mixture wherein the amount of air is substantially in excess a stoichiometry. In forming the high load combustion mixture both the quantity of air and the quantity of fuel are controlled to give a substantially stoichiometric combustion mixture.

Figure 5:
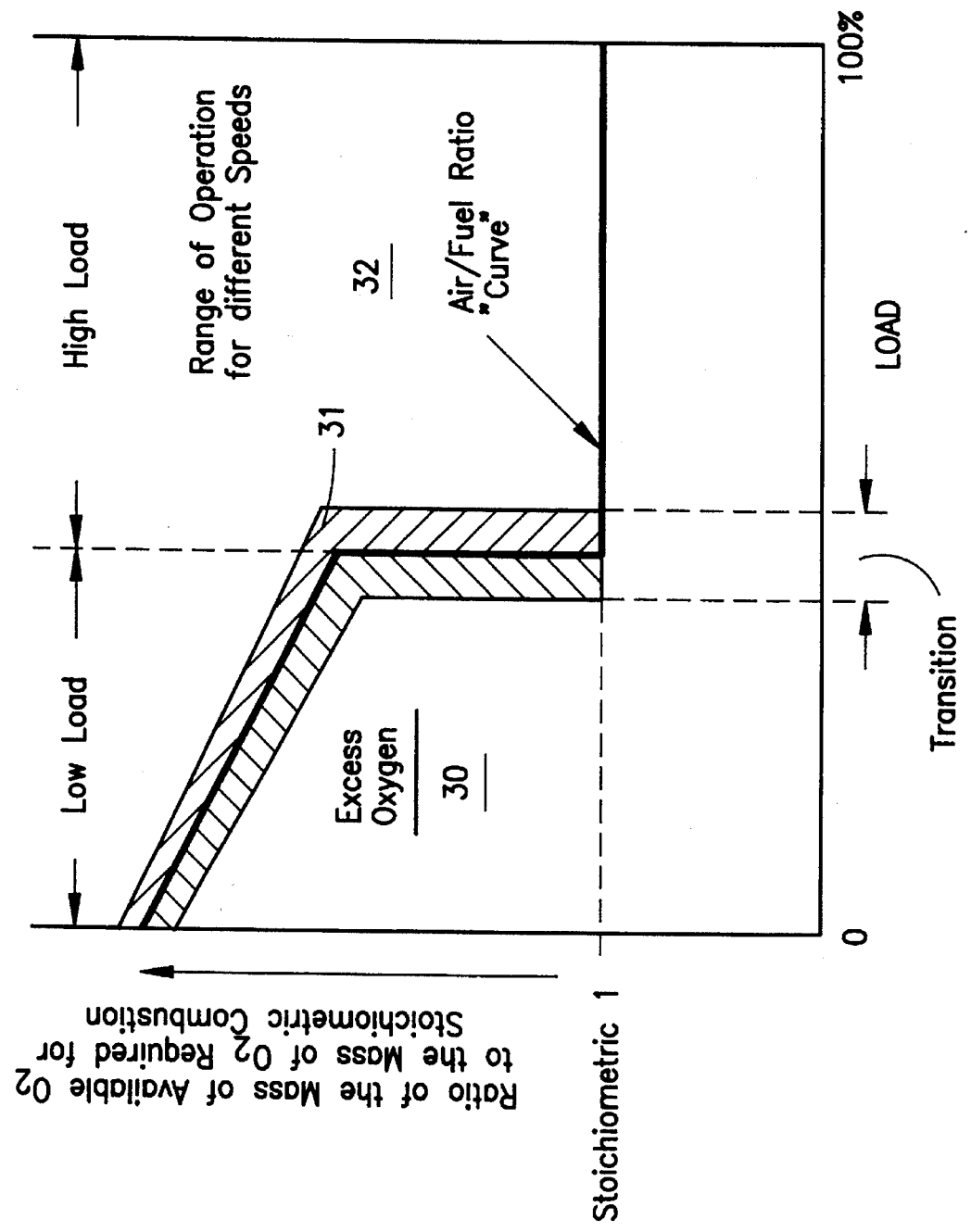
FIG. 5 is a graph illustrating the two modes of operation with the abscissa indicating percentage of maximum engine load and the ordinate indicating the ratio of the mass of available $O_2$ to the mass of $O_2$ required for stoichiometric combustion.

FIG. 5 is a graph illustrating the two modes of the combined cycle operation. The low load mode occurs at "light" load with unthrottled, lean combustion. The high load mode occurs at "higher" loads and is characterized by stoichiometric combustion. The partial-load range in which the engine is operated without throttle in the lean mode, that is, with λ>1, is characterized by the zone 30. The engine control is so designed that with increasing load in the transition zone 31, the value of λ decreases until a value of 1 is reached. Upon further increasing the engine load, the injection start and the injection duration are so regulated that over the high-load range 32 stoichiometry, that is λ=1, may be maintained until the full-load limit is reached.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A method of operation of an internal combustion engine, having a combustion chamber associated with each of a plurality of piston cylinders, to minimize NOx emission in exhaust gas, said method comprising:

detecting load on the vehicle engine as a low load or a high load;

responsive to detection of a low load, admitting a first quantity of air into the combustion chamber during an intake stroke and starting injection of a first quantity of fuel, during a compression stroke and adjacent top dead center, to form a first, lean combustion mixture wherein the first quantity of air is substantially in excess of stoichiometry;

igniting said lean combustion mixture;

responsive to detection of a high load, admitting a second quantity of air into the combustion chamber during an intake stroke and starting injection of a second quantity of fuel significantly earlier, relative to top dead center in the compression stroke, than start of injection of the first quantity of fuel, said second quantities of air and fuel being controlled to provide a second, substantially stoichiometric combustion mixture; and igniting said substantially stoichiometric combustion mixture.

2. A method in accordance with claim 1 wherein said first quantity of air is unthrottled.

3. A method in accordance with claim 1 wherein said first quantity of air is 1.5–10 times the stoichiometric amount.

4. A method in accordance with claim 3 wherein injection of said second quantity of fuel is initiated at least 40° before top dead center.

5. A method in accordance with claim 4 wherein injection of said first quantity of fuel is initiated 20° or less before top dead center.

6. A method in accordance with claim 1 wherein injection of said first quantity of fuel is initiated 20° or less before top dead center.

7. A method in accordance with claim 1 wherein injection of said second quantity of fuel is initiated at least 40° before top dead center.

8. A method in accordance with claim 7 wherein injection of said first quantity of fuel is initiated 20° or less before top dead center.

9. A method in accordance with claim 1 wherein injection of said second quantity of fuel is initiated at least 90° before top dead center.

10. A method in accordance with claim 1 wherein the second quantity of fuel is injected during an intake stroke.

11. A method in accordance with claim 10 wherein a detected load less than a value within the range of 30–35% of maximum engine load is taken as a low load and wherein a detected load more than said value is taken as a high load.

12. A method in accordance with claim 5 wherein a detected load less than a value within the range of 30–35% of maximum engine load is taken as a low load and wherein a detected load more than said value is taken as a high load.

13. A method in accordance with claim 12 additionally comprising sensing oxygen content in the exhaust gas during high load and controlling said second quantity of fuel, responsive to the sensed oxygen content, to maintain said second combustion mixture at substantially stoichiometric.

14. A method in accordance with claim 5 additionally comprising sensing oxygen content in the exhaust gas during high load and controlling said second quantity of fuel, responsive to the sensed oxygen content, to maintain said second combustion mixture at substantially stoichiometric.

15. A method in accordance with claim 1 additionally comprising sensing oxygen content in the exhaust gas during high load and controlling said second quantity of fuel, responsive to the sensed oxygen content, to maintain said second combustion mixture at substantially stoichiometric.

16. A method in accordance with claim 15 additionally comprising detecting throttle position and controlling said first quantity of fuel responsive to throttle position.

* * * * *